Dec. 7, 1971  P. G. BORDNER ET AL  3,624,964
CHANNEL-TYPE WEATHERSTRIP FOR SLIDABLE CLOSURES
Filed Feb. 2, 1970  2 Sheets-Sheet 1
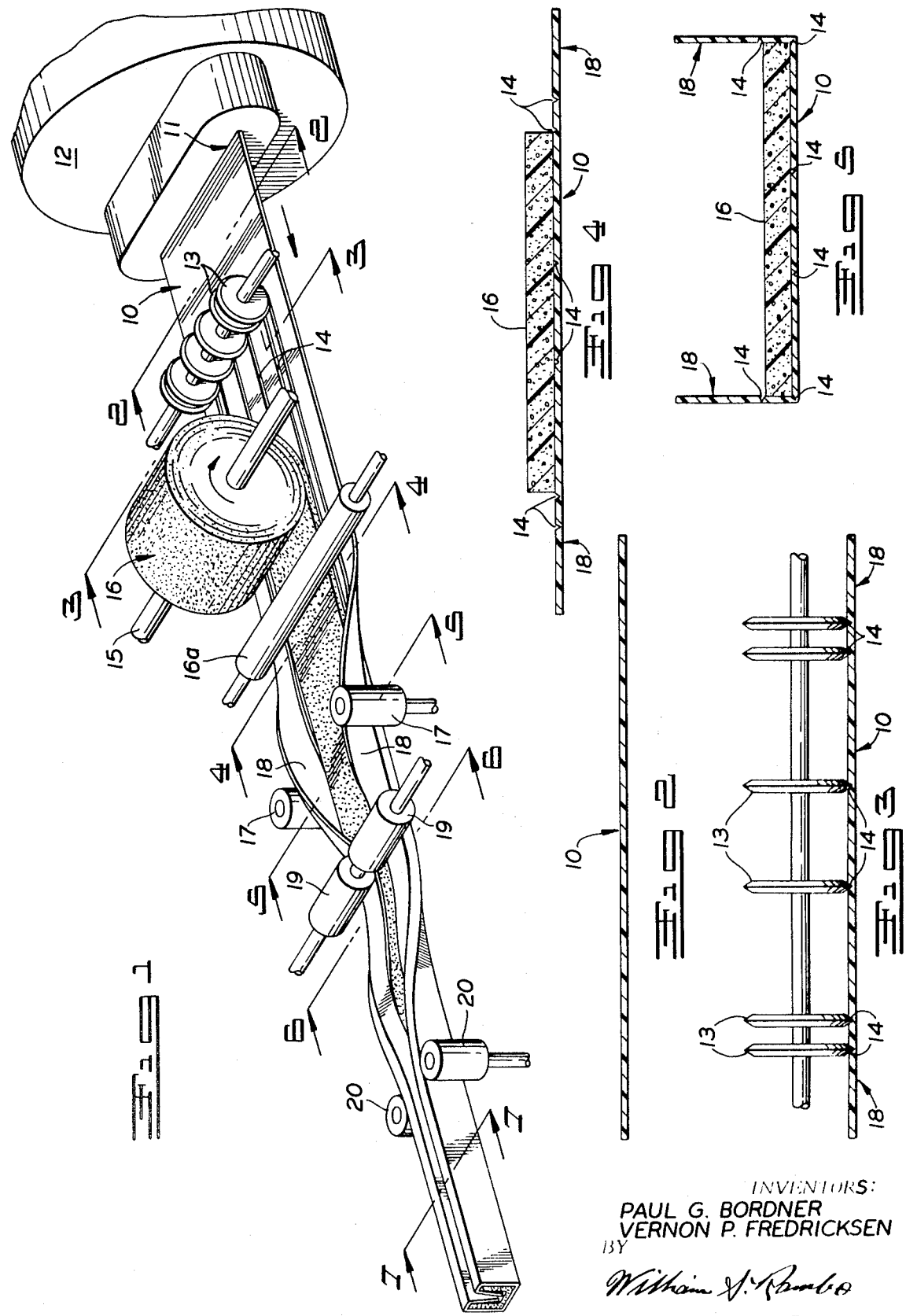
INVENTORS:
PAUL G. BORDNER
VERNON P. FREDRICKSEN
BY
William J. Rumbo
ATTORNEY

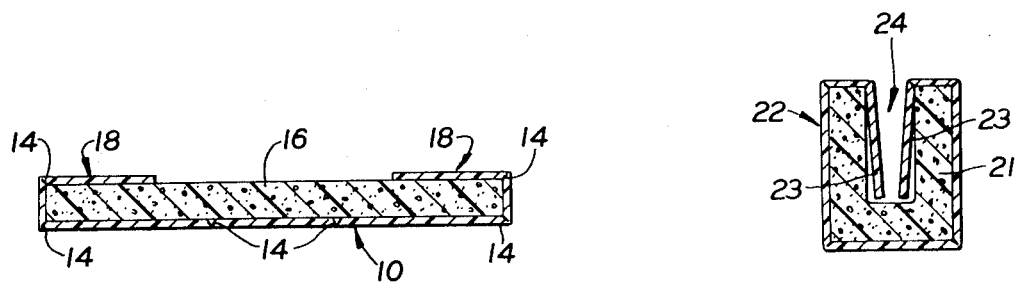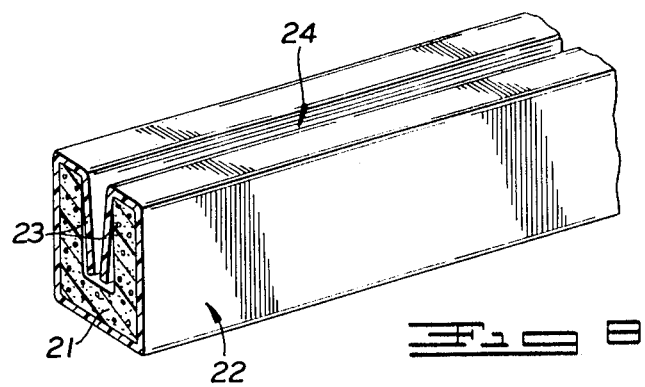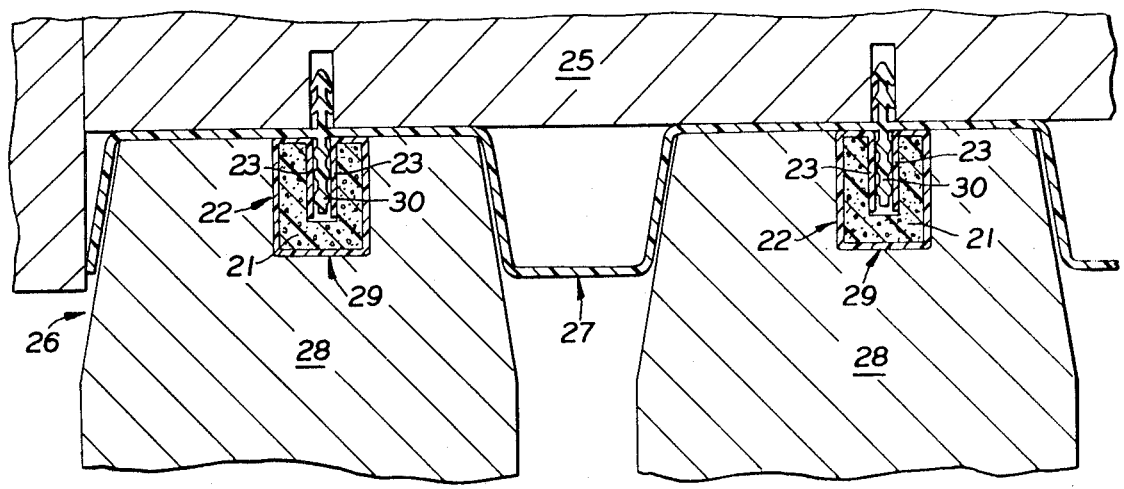

United States Patent Office 3,624,964
Patented Dec. 7, 1971

3,624,964
CHANNEL-TYPE WEATHERSTRIP FOR
SLIDABLE CLOSURES
Paul G. Bordner, Franklin County, Ohio, and Vernon P. Fredricksen, Washington County, Minn., assignors to Crane Plastics, Inc., Columbus, Ohio
Filed Feb. 2, 1970, Ser. No. 7,785
Int. Cl. E06b 7/23
U.S. Cl. 49—475          3 Claims

ABSTRACT OF THE DISCLOSURE

A channel-shaped weatherstrip of non-absorbent flexible plastic materials for installation in a bearing edge of a slidable closure and having a sandwich construction made up of a relatively thin outer layer of a first, relatively hard, wear-resistant plastic and an inner core of a relatively soft, flexible, foamed or expanded plastic.

BACKGROUND OF THE INVENTION

This invention relates generally to weatherstrips or seals, and more particularly to an improved channel-type, composite plastic weatherstrip for slidable closures such as windows and doors.

In the past, considerable difficulty has been encountered in effectively weather sealing the frame-engaging bearing surface or surfaces of sliding windows and doors. Ordinarily, sliding windows and doors are formed on the frame-engaging surfaces thereof with guide channels or slots into which extend relatively narrow guide strips or rail members which guide the window or door into its sliding movement. Usually these guide channels or slots house a channel-type weatherstrip of felt or other textile fabric material. The use of felt or textile fabrics as a weatherstripping material has two essential disadvantages. First, such materials are highly absorbent with the result that moisture is easily retained in the weatherstrip to thus increase the chance of rotting of surrounding wood, or corrosion of adjacent metal. Secondly, felt and similar textile fabrics are subject to rather rapid wear and consequent deterioration under the frictional and other forces to which the weatherstrip is normally subjected.

SUMMARY AND OBJECTS OF THE INVENTION

As an answer to these problems, the present invention provides a channel-type weatherstrip of laminated plastic construction in which an inner core or layer of a non-absorbent, foamed or expanded plastic is substantially encased in an outer skin or ply of a tough, harder, and wear-resistant plastic. The inner core or layer of foamed plastic is of a size and resiliency to cause the outer, wear-resistant ply or skin to snuggly hug and fit against the adjacent bearing surfaces of the window or door frame and the associated guide strip, to thereby provide an effective thermal and draft barrier. The outer skin or ply of the channel weatherstrip is also preferably formed from one of the so-called self-lubricating plastics or resins, such as polypropylene or polyethylene, to thereby provide an extremely low coefficient of friction between the weatherstrip and the associated guide strip and frame during sliding movement of the closure member.

The principal object of this invention is to provide an efficient channel-type weatherstrip for slidable closures which is non-absorbent, which retains its resilient flexibility after prolonged usage, which is extremely wear resistant, and which provides a low coefficient of friction with relatively engaging parts of surfaces.

BRIEF DESCRIPTION OF THE DRAWINGS

In the accompanying drawings:
FIG. 1 is a diagrammatic perspective view showing the formation of a composite plastic weatherstrip according to this invention;
FIGS. 2–7 are transverse vertical sectional views taken along the correspondingly numbered section lines of FIG. 1 and illustrating the successive steps employed in fabricating the present composite plastic weatherstrips;
FIG. 8 is a fragmentary perspective view of a segment of the present weatherstrip in its finally folded configuration; and
FIG. 9 is a fragmentary horizontal sectional view taken through one side of a double-hung window frame and showing the present composite plastic weatherstrip installed in the side channels of the sash.

DESCRIPTION OF PREFERRED EMBODIMENTS OF THE INVENTION

Referring now to the drawings, and more particularly to FIG. 1 thereof, the present laminated plastic weatherstrip is preferably formed by extruding a relatively thin, flat, strip or sheet 10 of a relatively high density, wear-resistant, thermoplastic synthetic resin, such as polypropylene, from the discharge orifice 11 of a conventional extrusion apparatus 12. The strip or sheet 10 is conveyed longitudinally from the extrusion machine 12 and the upper surface of the strip is brought into contact with a series of transversely spaced, rotatable, knife edge rollers 13. The rollers are arranged to form a series of longitudinally extending, transversely spaced, parallel score or fold lines 14 in the upper surface of the strip 10.

Positioned immediately downstream from the scoring rollers 13 is a supply roll 15 on which is wound a continuous, and relatively long strip 16 of expanded, cellular, foamed polyuresthane. As shown particularly in FIGS. 4–6, the strip or layer 16 of polyurethane is narrower but substantially thicker than the polypropylene strip or sheet 10. The supply roll 15 is arranged above the longitudinally moving strip 10 so as to cause the strip 16 of expanded polyurethane to be withdrawn tangentially from the roll 15 for deposit on the central area of the strip 10 of polypropylene. A pressure roll 16a is positioned adjacent the supply roll 15 so as to apply pressure to the superposed and laminated synthetic resin strips. Preferably, the polypropylene strip 10 is in a heat-softened condition as it passes from the extrusion orifice 11 and beneath the scoring rollers 13 and the pressure roller 16a, in order that the relatively engaging surfaces of the polypropylene strip 10 and the polyurethane strip 16 may be heat-bonded to one another. Alternatively, a suitable synthetic resin adhesive may be applied between the relatively adjoining surfaces of the two strips to bond the same together.

FIG. 2 illustrates, in cross section, the extruded polypropylene strip or sheet 10 as it leaves the extrusion orifice 11. FIG. 3 illustrates the step of forming the relatively spaced score or fold lines 14 in the upper surface of the polypropylene strip 10 and FIG. 4 is a transverse cross sectional view showing the lamination of the expanded polyurethane strip 16 to the underlying polypropylene strip 10.

Returning to FIG. 1, the laminated strips 10 and 16 pass from the pressure roll 16a between a first set of folding rolls 17 which function to bend the outer edge portions 18 of the relatively wider polypropylene strip 10 upwardly around the side edges of the expanded polyurethane layer or ply 16. This first bending or folding operation causes the laminated strips to assume the approximate configuration illustrated in FIG. 5. From the first set of folding rolls 17, the laminated strips then pass beneath a second set of horizontally arranged folding rolls 19 which bend and fold the initially upturned outer edge portion 18 of the polypropylene strip 10 downwardly over the upper surface of the expanded polyurethane strip 16 as shown in FIG. 6. The thus folded web then passes between a third set of folding rolls 20 where the composite, laminated strips are folded to their final, channel-shaped configuration as shown in FIGS. 7 and 8 and then cut transversely into desired lengths.

In its finally folded configuration, the present weatherstrip comprises an elongated channel-shaped body of laminated plastic construction, wherein the relatively thicker polyurethane layer 16 forms a generally U-shaped core 21 of comparatively soft, resiliently compressible, non-absorbent synthetic resin material, and the polypropylene sheet 10 forms a relatively thin outer casing or clad 22 which substantially encases the inner core and which is harder and more dense than the expanded polyurethane inner core. The unadhered, free edge portions of the polypropylene strip 10 define a pair of opposed, inner side walls 23 for the outwardly opening channel 24 of the weatherstrip. The inner side walls 23 project inwardly of the channel 24 in slightly convergent, angular relationship, but are free to flex within the channel so as to conform closely to a guide strip or other member positioned in the channel.

Also, due to the inherent, self-lubricating properties of polypropylene, the inner side walls 23 will provide opposed bearing surfaces having an extremely low coefficient of friction, and excellent wear resistance.

FIG. 9 of the drawings is a horizontal sectional view taken through one side of a double-hung window assembly and showing one possible application of the present weatherstrip. In this assembly, the reference numeral 25 designates one of the vertical side walls of a window opening 26. Secured to the side wall 25 is a double track window jamb 27 which may be of substantially rigid plastic or metal composition. Slidably positioned in each of the tracks of the jamb 27 is the side edge portion of a window sash 28. Each sash 28 is formed along its side edges with a rectangular groove or rabbet 29 which extends the full height of the sash, and in which is secured a coextensive length of the present weatherstrip. The jamb 27 is formed with a pair of vertically extending guide strips 30 which project into the channels 24 of the weatherstrip.

Thus, in the operation of the window sash 28, the weatherstrip moves with the sash and relative to the stationary jamb 27 and guide strip 30. The inner side walls 23 and the core 21 of the weatherstrip are free to yield and flex so as to maintain the walls 23 in close conformity to the guide strip 30 in spite of considerable tolerance between the sash edges and the tracks of the jamb 27. This maintains an effective draft and thermal barrier between the sash and jamb to prevent the passage of air around the edges of the sash of the window. At the same time, due to the self-lubricating, low coefficient of friction properties of the polypropylene outer casing of the weatherstrip, there is very little frictional drag between the guide strip 30 and the walls 23 during opening and closing movement of the sash.

We claim:
1. A weatherstrip for a slidable closure consisting of an elongated, unitary, generally U-shaped channel-like body of laminated plastic composition, said body including a U-shaped inner core composed of a relatively soft, resiliently compressible, synthetic resin, and an integral outer casing enclosing said inner core on substantially all sides thereof and composed of a second, relatively thinner and harder synthetic resin having self-lubricating properties.

2. A weatherstrip according to claim 1, wherein said inner core is composed of expanded polyurethane and said outer casing is composed of polypropylene of substantially higher density than said polyurethane.

3. A weatherstrip according to claim 1, wherein the outer casing of said body includes a pair of relatively spaced apart, longitudinally coextensive walls extending inwardly of the channel of said body and providing self-lubricating bearing surfaces for said weatherstrip.

References Cited
UNITED STATES PATENTS

| | | | |
|---|---|---|---|
| 2,796,960 | 6/1957 | Reynolds | 49—419 X |
| 3,068,136 | 12/1962 | Reid | 49—440 X |
| 3,258,876 | 7/1966 | Deisenroth et al. | 49—441 |
| 3,305,973 | 2/1967 | Bohn | 49—488 X |
| 3,341,975 | 9/1967 | Tylisz | 49—488 X |

DAVID J. WILLIAMOWSKY, Primary Examiner

P. C. KANNAN, Assistant Examiner

U.S. Cl. X.R.
49—441, 488, 489